Patented Apr. 13, 1948

2,439,650

UNITED STATES PATENT OFFICE 2,439,650

METHOD OF MAKING GRANULES

Charles W. Cuno, Wilmington, Ill., assignor to The Lehon Company, a corporation of Illinois No Drawing. Application January 28, 1944, Serial No. 520,135

12 Claims. (Cl. 117—100)

Much effort has been devoted to the development of granules of a character suitable for surfacing composition roofing material. It is, of course, necessary that such granules be able to stand severe weathering. At the present time, commercial granules are usually either natural mineral products such as crushed slate, ceramic or semi-ceramic products. These latter are subject to the objection of high cost and, the former, to various objections including limited choice of color.

Numerous substitutes have been proposed. Some of them have proved unsatisfactory because of absorption of moisture and crumbling upon freezing. Some have been subject to the effect known as "blooming" because of containing a substance such as lime which would be dissolved by rain and, reacting with the carbon dioxide of the air, leave a discoloring insoluble white coating. Some lacked hardness so that they were crushed by the weight of a man walking on the roof. There may be some which, though free from the foregoing objections, would have been too expensive for commercial use.

According to the present invention, all of these difficulties are substantially overcome. The raw material cost of the preferred embodiment is very low, the manufacturing cost is low, the resulting granule is hard, does not deteriorate appreciably in weathering, and is not objectionable from the standpoint of producing bloom. According to the preferred process even the cost of the pigment is cut in half as compared to the closest prior processes.

In its preferred form, the invention consists in mixing expanded slag granules with a saturated solution of magnesium fluosilicate adding lime hydrate or Portland cement, and then after mixing, adding the pigment. The mixture is then stirred continually until danger of adhesion is passed and preferably maintained in a stream of warm or hot air, until substantially dry, this taking only about thirty (30) minutes or less.

The expanded slag is readily obtainable. It is produced by cooling the molten slag in the presence of water or steam. Other granular material may be used, preferably porous material such as cinders or porous ceramic materials. Expanded slag is preferred because of its great porosity and low cost. Non-porous material or less porous material, such as crushed slag, non-porous vitreous granules, and the like can be used although the results are not as satisfactory.

In place of the magnesium fluosilicate, other soluble fluosilicates, such as ammonium fluosilicate, lithium fluosilicate or some soluble metallic fluosilicates such as copper, manganese and nickel fluosilicates can be used although at the present time, the cost of these are commercially prohibitive. In place of the lime, may be used white Portland cement or ordinary Portland cement, or if the cost should become reasonable other suitable metallic bases such as sodium hydroxide or alkaline earth hydroxides, such as barium hydroxide or strontium hydroxide; the object being to produce in situ a, more or less insoluble fluosilicate by reaction of the more soluble magnesium fluosilicate with other substances which will produce the less soluble fluosilicates. By suitable metallic base is meant a one which is soluble in water and reacts with the magnesium fluosilicates to form a substantially insoluble fluosilicate.

Any suitable pigment may be used such as ochers, umbers, yellow, red and black ferric oxides, or an inert green oxide, etc.

The preferred proportions by weight are six parts of slag to one-half to one part of lime or cement and one to two parts of magnesium fluosilicate. The amount of water is not critical but a saturated solution of magnesium fluosilicate is preferred. Fairly wide variations may be made in these proportions. For example, the hydrated lime may vary at least from one-half to one and one-half parts, and the cement at least from three-fourths to one and one-half parts. Theoretically sufficient magnesium fluosilicate should be added to neutralize and react with all the free lime and any other substance reacting with the fluosilicate. In practice a small excess of fluosilicate is preferred.

The proportion of pigments added will depend upon the color and brightness desired, generally one-fourth to one-half part being suitable. Tests have indicated that for a given visual effect, only approximately one-half the pigment is required that would be required if it were mixed initially with the Portland cement. Of course the pigment is omitted if a white or cement colored granule is desired.

When, in accordance with this invention, the magnesium fluosilicate solution is added to the porous granules first and then the lime or lime bearing material, the effect is to produce the calcium fluosilicate "in situ" well within the pores, filling the pores and making harder granules. That is, by adding the fluosilicate solution first, it penetrates into the pores of the granules and draws the cement or lime into the pores so that a denser, harder, less porous material is formed than would be the case if the cement or lime were added to a dry granule, or when water is added first instead of the fluosilicate.

It is believed that the major reaction is that of the fluosilicate and the lime to produce calcium fluosilicate which is substantially insoluble. But other fluosilicates, fluorides and silicates are undoubtedly also formed together with magnesium hydroxide, which is much less soluble than lime and which does not produce an objectionable bloom. In the case of Portland cement, the lime for this reaction is obtained from the Portland cement. That magnesium fluosilicate acts to accelerate the setting of the Portland cement and to harden it is known to prior art. For example, a magnesium fluosilicate solution has been used to wash a cement floor, to harden it. Also very small quantities have been mixed with the cement. It has not been possible, however, to mix with the cement proportions such as are now contemplated which are sufficient to use up all of the free lime available from the cement. This result is made possible by applying the fluosilicate solution to the granules first, so that the reaction takes place in situ.

From the foregoing it is seen that a granule has been developed which is weatherproof and color fast, light in weight, inexpensive, and hard enough so that a surfacing of such granules or roofing will be able to withstand the weight of a worker walking thereon. It has been observed from slicing an expanded slag granule at least an eighth of an inch in diameter treated in accordance with this invention that the pores are substantially filled with the precipitate throughout the granule, thus showing that the penetration is at least one-sixteenth inch from the surface.

I claim:

1. The method of making hard weatherproof granules for covering material comprising the steps of mixing expanded slag granules with a solution of magnesium fluosilicate in direct contact with the granules, adding thereto and mixing therewith a substance providing lime for reaction with said magnesium fluosilicate, and thereafter adding and mixing therewith a pigment, thereafter continuing agitation of the coated granules until the coating has sufficiently set to prevent adhesion of the granules to one another.

2. The method of making hard weatherproof granules for covering material comprising the steps of mixing porous granules with a solution of magnesium fluosilicate in direct contact with the granules, adding thereto and mixing therewith a substance providing lime for reaction with said magnesium fluosilicate, and thereafter adding and mixing therewith a pigment, thereafter continuing agitation of the coated granules until the coating has sufficiently set to prevent adhesion of the granules to one another.

3. The method of making hard weatherproof granules for surfacing covering material comprising the steps of mixing porous granules with a solution of a soluble fluosilicate in direct contact with the granules, adding thereto and mixing therewith a substance providing lime for reaction with said fluosilicate, thereafter adding and mixing therewith a pigment, and thereafter continuing agitation of the coated granules until the coating has sufficiently set to prevent adhesion of the granules to one another.

4. The method of making hard weatherproof granules for surfacing covering material comprising the steps of mixing porous granules with a solution of a soluble fluosilicate in direct contact with the granules, adding thereto and mixing therewith a substance providing lime for reaction with said fluosilicate, and thereafter continuing agitation of the coated granules until the coating has sufficiently set to prevent adhesion of the granules to one another.

5. The method of making hard weatherproof granules for surfacing covering material comprising the steps of mixing granules with a solution of magnesium fluosilicate in direct contact with the granules, adding thereto and mixing therewith a substance providing lime for reaction with said magnesium fluosilicate, thereafter adding and mixing therewith a pigment, and thereafter continuing agitation of the coated granules until the coating has sufficiently set to prevent adhesion of the granules to one another.

6. The method of making hard weatherproof granules for surfacing covering material comprising the steps of mixing granules with a solution of magnesium fluosilicate in direct contact with the granules, adding thereto and mixing therewith a substance providing lime for reaction with said magnesium fluosilicate, and thereafter continuing agitation of the coated granules until the coating has sufficiently set to prevent adhesion of the granules to one another.

7. The method of making hard weatherproof granules for surfacing covering material comprising the steps of mixing granules with a solution of a fluosilicate in direct contact with the granules, adding thereto and mixing therewith a substance providing a soluble metallic base which will react with said fluosilicate to produce an insoluble fluosilicate, and thereafter continuing agitation of the coated granules until the coating has sufficiently set to prevent adhesion of the granules to one another.

8. The method of making hard weatherproof granules for surfacing covering material comprising the steps of mixing granules with a solution of a fluosilicate in direct contact with the granules, adding thereto and mixing therewith a substance providing a soluble metallic base which will react with said fluosilicate to produce an insoluble fluosilicate.

9. The method of making hard weatherproof granules for surfacing covering material comprising the steps of mixing granules with a solution of magnesium fluosilicate in direct contact with the granules, adding thereto and mixing therewith Portland cement for reaction with said magnesium fluosilicate, and thereafter continuing agitation of the coated granules until the coating has sufficiently set to prevent adhesion of the granules to one another.

10. The method of making hard weatherproof granules for surfacing covering material comprising the steps of mixing granules with a solution of a fluosilicate in direct contact with the granules, adding thereto and mixing therewith Portland cement for reaction with said fluosilicate to produce an insoluble fluosilicate, and thereafter continuing agitation of the coated granules until the coating has sufficiently set to prevent adhesion of the granules to one another.

11. The method of making hard weatherproof granules for surfacing covering material comprising the steps of mixing granules with a solution of a fluosilicate in direct contact with the granules, adding thereto and mixing therewith Portland cement for reaction with said fluosilicate to produce an insoluble fluosilicate.

12. The method of making hard weatherproof granules for surfacing covering material comprising the steps of mixing bare porous granules with a solution of a soluble fluosilicate, adding thereto and mixing therewith a substance providing lime for reaction with said fluosilicate, thereafter adding and mixing therewith a pigment, and thereafter continuing agitation of the coated granules until the coating has sufficiently set to prevent adhesion of the granules to one another.

CHARLES W. CUNO.

REFERENCES CITED

The following references are of record in the file of this patent:

UNITED STATES PATENTS

| Number | Name | Date |
| --- | --- | --- |
| 2,057,677 | Gundlach | Oct. 20, 1936 |
| 2,061,246 | Nichols | Nov. 17, 1936 |
| 2,114,692 | Ward | Apr. 19, 1938 |
| 2,215,600 | Veazy | Sept. 24, 1940 |
| 2,294,523 | Veazy | Sept. 1, 1942 |

FOREIGN PATENTS

| Number | Country | Date |
| --- | --- | --- |
| 692,321 | Germany | 1940 |